United States Patent
Toma et al.

(10) Patent No.: US 7,588,352 B2
(45) Date of Patent: Sep. 15, 2009

(54) OPTICAL APPARATUS

(75) Inventors: Takahiro Toma, Himeji (JP); Yoshihiro Horikawa, Himeji (JP); Toru Kontani, Himeji (JP)

(73) Assignee: Ushiodenki Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/035,530

(22) Filed: Feb. 22, 2008

(65) Prior Publication Data

US 2008/0205063 A1 Aug. 28, 2008

(30) Foreign Application Priority Data

Feb. 27, 2007 (JP) .............................. 2007-046350
Sep. 20, 2007 (JP) .............................. 2007-243356

(51) Int. Cl.
*F21V 7/00* (2006.01)

(52) U.S. Cl. .................. 362/304; 362/263; 362/297; 362/346; 313/114; 313/631

(58) Field of Classification Search ................ 362/263, 362/297, 304, 346; 313/113, 114, 631
See application file for complete search history.

(56) References Cited

U.S. PATENT DOCUMENTS 5,418,420 A * 5/1995 Roberts ...................... 362/297
5,677,983 A 10/1997 Oparin et al.
6,737,807 B2 * 5/2004 Nishida ...................... 313/632

2004/0070735 A1 4/2004 Sekiguchi et al.

FOREIGN PATENT DOCUMENTS

| EP | 1 286 383 A2 | 2/2003 |
| JP | 63-162320 U | 10/1988 |
| JP | 3-266824 A | 11/1991 |
| JP | 6-13029 A | 1/1994 |
| JP | 10-92377 A | 4/1998 |
| JP | 2001-242543 A | 9/2001 |

OTHER PUBLICATIONS

European Search Report for Application No. EP 08 00 2457.

* cited by examiner

*Primary Examiner*—Stephen F Husar
(74) *Attorney, Agent, or Firm*—David S. Safran; Roberts Mlotkowski Safran & Cole, P.C.

(57) ABSTRACT

Optical apparatus with a discharge lamp and a concave reflecting mirror, the concave reflecting mirror has a front elliptical reflecting mirror portion, a middle spherical reflecting mirror portion, and a rear elliptical reflecting mirror portion; the relationship between an angle $\alpha$ between a virtual tangential line VTL, which runs from the center position between the electrodes to the outer surface of the electrode positioned towards the neck of the concave reflecting mirror, and the beam axis Z and an angle $\beta$ between a virtual straight line VSL, which runs from the center position between the electrodes to the boundary position between the middle spherical reflecting mirror portion and the rear elliptical reflecting mirror portion, and the beam axis Z is $\beta>\alpha$; and the relationship between the volume V of the electrode E1 (mm$^3$) and the wattage (P) meets the condition, $0.07 \times EXP(0.014 \times P) < V$.

1 Claim, 8 Drawing Sheets

FIG. 6

| Lamp No. | Lighting power | Volume | Results |
|---|---|---|---|
| Lamp 1 | 230 W | 1.55 | Melted |
| Lamp 2 | 230 W | 1.60 | Melted |
| Lamp 3 | 230 W | 1.72 | Not melted |
| Lamp 4 | 230 W | 1.92 | Not melted |
| Lamp 5 | 230 W | 2.02 | Not melted |
| Lamp 6 | 250 W | 2.15 | Melted |
| Lamp 7 | 250 W | 2.27 | Not melted |
| Lamp 8 | 250 W | 2.46 | Not melted |
| Lamp 9 | 250 W | 2.78 | Not melted |
| Lamp 10 | 275 W | 3.01 | Melted |
| Lamp 11 | 275 W | 3.08 | Melted |
| Lamp 12 | 275 W | 3.24 | Not melted |
| Lamp 13 | 275 W | 3.34 | Not melted |
| Lamp 14 | 275 W | 3.40 | Not melted |
| Lamp 15 | 276 W | 3.68 | Not melted |
| Lamp 16 | 275 W | 3.95 | Not melted |

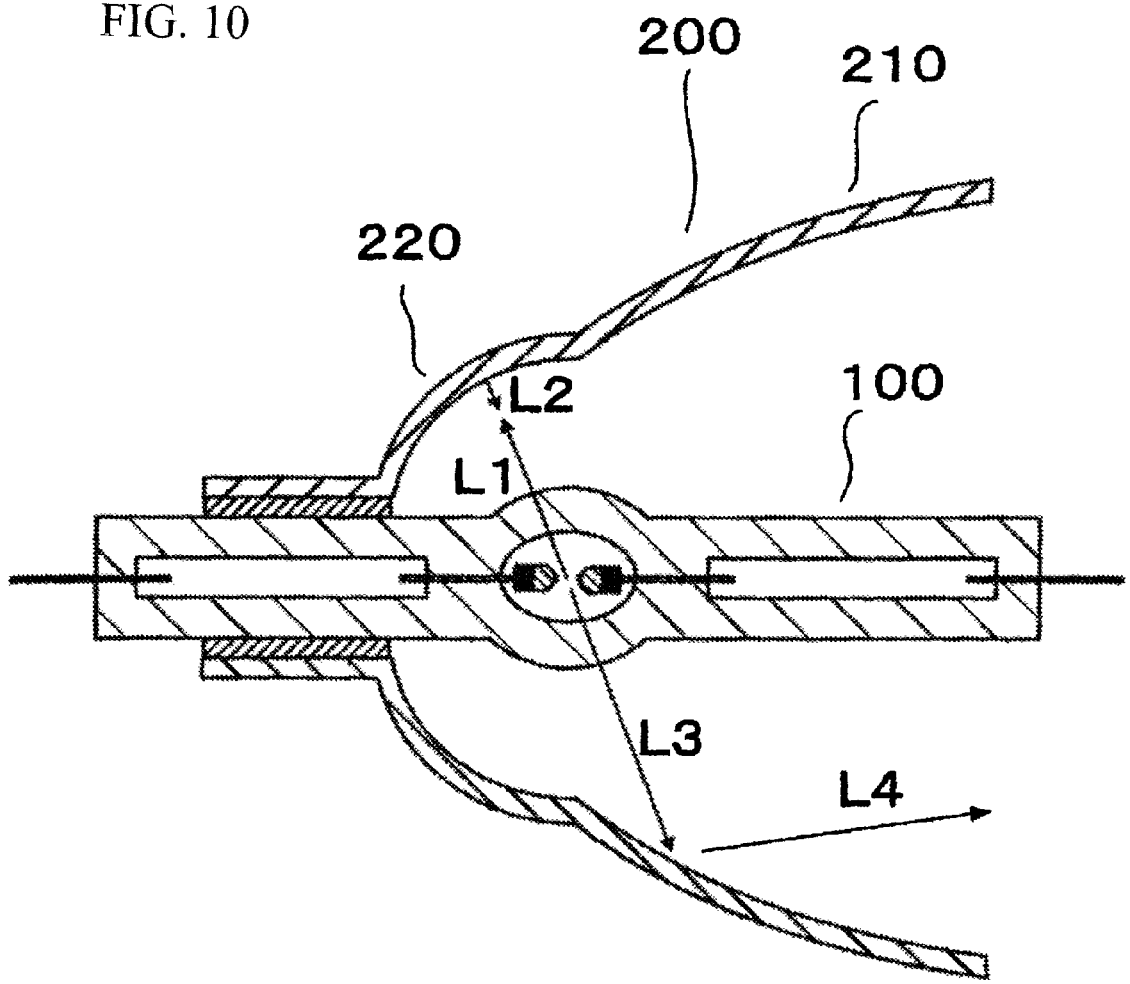

OPTICAL APPARATUS

BACKGROUND OF THE INVENTION

1. Field of Invention

This invention concerns an optical apparatus. In particular, it concerns an optical apparatus used in projection equipment.

2. Description of Related Art

Projection equipment is generally either the type that uses liquid crystal (LCD) panels or the type that uses DLP.

The type that uses liquid crystal panels has both a one-layer variety and a three-layer variety, but with either variety, the beam emitted from the light source is split into three colors (RGB—R=red, G=green, B=blue), and after transmission coordination of the light corresponding to image information in the liquid crystal panel, the three colors that pass through the panels are combined and projected onto a screen.

In the type that uses DLP, on the other hand, the beam emitted from the light source passes through a rotating filter by which the RGB domains are divided and formed, irradiated by means of time division such as a space modulation element (what is called a light modulation device, or specifically a DMD element), and specified beams are reflected by the DMD element and projected onto the screen. A DMD element is spread with several million small mirrors, one per pixel, and by controlling the direction of each small mirror it is possible to control the projection of light.

In comparison with the LCD type, the DLP type has a simpler optical system and there is no need to use as many as three layers of LCD panel, and so the equipment as a whole has the advantage of being smaller and simpler.

On the other hand, high pressure discharge lamps with high mercury vapor pressure are used as light sources for the projection equipment. The reason for the high mercury vapor pressure is to enable a high light output in the visible spectrum.

Furthermore, these discharge lamps (simply called "lamps" hereafter) are inserted in concave reflecting mirrors in the shape of an ellipsoid of revolution (roughly rice bowl shaped) in order to brighten the image projected on the screen. Using a concave reflecting mirror can efficiently concentrate the light radiated from the lamp on a screen of limited area.

In recent years it has become more common for projection equipment, particularly that used for presentations, to be used away from one's main location, and so there have been strong demands for smaller and lighter equipment in the sense that it can be carried more easily.

When smaller size is demanded of projection equipment, reduction of the optical apparatus (discharge lamp and concave reflecting mirror) incorporated in the projection equipment is naturally demanded as well.

It is also natural to say that, given such constraints on size and shape, it is necessary to heighten the efficiency of use of the light radiated by the lamp.

FIG. 10 shows the structure of a reflecting mirror devised to heighten the efficiency of use of light.

The reflecting mirror 200 is constituted of an elliptical reflecting mirror portion 210 and a spherical reflecting mirror portion 220, respectively located to the front and rear in the direction of radiation. Specifically, the elliptical reflecting mirror portion 210 is formed toward the front opening of the reflecting mirror 200, and the spherical reflecting mirror portion 220 is formed toward the rear opening or neck.

With this constitution, light beam L1 radiated by the lamp 100 toward the neck of the reflecting mirror is reflected by the spherical reflecting mirror portion 220 and returns in the direction of the arc (light beam L2), after which it passes through the discharge arc toward the elliptical reflecting mirror portion 210 (light beam L3) and is reflected toward the front opening (light beam L4).

Compared with the use of a reflecting mirror with an elliptical surface only, this constitution is certainly able to improve the efficiency of use of light in order to be able to use the light that is radiated or reflected in the vicinity of the neck of the reflecting mirror.

In the event that the volume of the electrode is enlarged, however, there is still the problem that the light radiated by the discharge arc (L1) is blocked by the body of the electrode, or the light reflected by the reflecting mirror 200 is blocked by the electrodes or other constituent parts of the lamp.

The structure shown in FIG. 10 is described in JP-A-H3-266284 of 1991 and JP-U-S63-162320 of 1988, for example.

Patent Document 1 JP-A-H3-266284 of 1991
Patent Document 2 JP-U-S63-162320 of 1988
Patent Document 3 JP-A-2002-298625 (corresponding to US-A-2004/0070735)

SUMMARY OF THE INVENTION

The problem to be solved by this invention is that of providing an optical apparatus that can use a lamp's radiant energy efficiently and that is suited to demands for smaller size.

To solve this problem the optical apparatus of this invention comprises a short-arc type discharge lamp with a pair of electrodes that face each other within a discharge vessel and a concave reflecting mirror placed to surround the discharge lamp with its beam axis matching the arc direction of the discharge lamp.

(a) The concave reflecting mirror comprises a front elliptical reflecting mirror portion, a middle spherical reflecting mirror portion, and a rear elliptical reflecting mirror portion. The front elliptical reflecting mirror portion and the rear elliptical reflecting mirror portion have at least their first focal points collocated between the electrodes, are positioned front and back in relation to the direction of light radiation of the concave reflecting mirror. The middle spherical reflecting mirror portion is located between the front elliptical reflecting mirror portion and the rear elliptical reflecting mirror portion with the first focal points as the center position CP.

(b) The relationship between the angle $\alpha$ between a virtual tangential line VTL and the beam axis Z and the angle $\beta$ between a virtual straight line VSL and the beam axis Z is $\beta > \alpha$. Here, the virtual tangential line VTL is a straight line that runs from the center position CP to the outer surface of the electrode positioned towards the neck of the concave reflecting mirror, and the virtual straight line VSL is a straight line that runs from the center position CP to the boundary position between the middle spherical reflecting mirror portion and the rear elliptical reflecting mirror portion.

(c) The relationship between the volume V (in $mm^3$) of the one of the pair of discharge lamp electrodes that is positioned opposite the direction of light radiation of the concave reflecting mirror and the wattage (P) during steady lighting meets the condition, $0.07 \times EXP(0.014 \times P) < V$.

EFFECT OF THE INVENTION

In this invention, the concave reflecting mirror comprises a front elliptical reflecting mirror portion, a middle spherical reflecting mirror portion, and a rear elliptical reflecting mirror portion, and so light reflected by the rear elliptical reflecting mirror portion does not return to the discharge arc, but is reflected toward the front opening.

Moreover, the relationship between the angle α formed by a virtual tangential line VTL, which runs from the center position A1 between the electrodes to the outer surface of the electrode positioned towards neck of the concave reflecting mirror, and the direction in which the electrode of the discharge lamp extends and the angle β formed by a virtual straight line VSL, which runs from the center position CP to the boundary position between the middle spherical reflecting mirror portion and the rear elliptical reflecting mirror portion, and the direction in which the electrode of the discharge lamp extends is β>α, and so the shape of the electrode positioned toward the neck is stipulated in such a way that the light to be reflected by the rear elliptical reflecting mirror portion will be adequate.

Moreover, because the relationship between the volume V (in mm$^3$) of the one of the pair of discharge lamp electrodes that is positioned opposite the direction of light radiation of the concave reflecting mirror and the wattage (P) during steady lighting meets the condition, $0.07 \times EXP(0.014 \times P) < V$, the function of withstanding heat capacity can be preserved while meeting the stipulation of the size and shape of the electrode positioned toward the neck.

BRIEF DESCRIPTION OF THE DRAWINGS

FIG. 6 shows testing results of the optical apparatus of this invention.

FIG. 10 shows conventional optical apparatus.

DETAILED DESCRIPTION OF THE INVENTION

Figure 1:
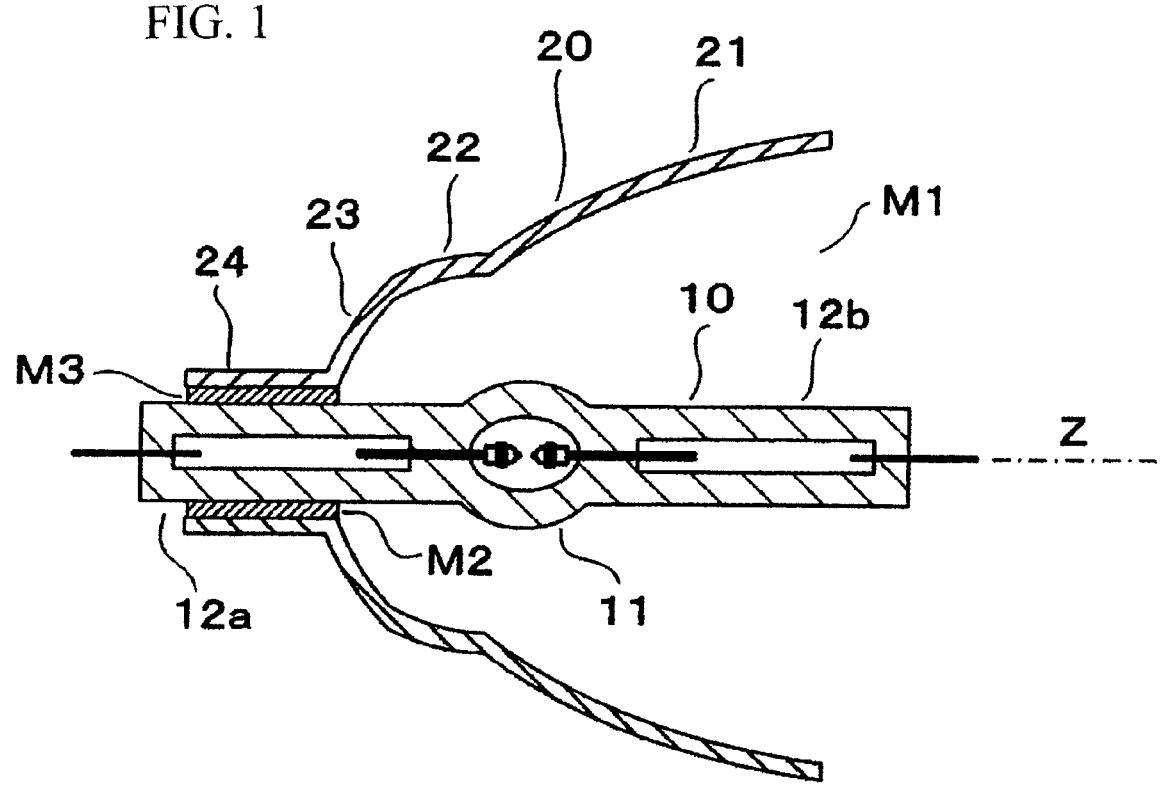
FIG. 1 shows the overall structure of the optical apparatus of this invention.

FIG. 1 shows the overall structure of the optical apparatus of this invention.

The optical apparatus comprises a discharge lamp (simply called a "lamp" hereafter) 10 and a concave reflecting mirror (simply called a "reflecting mirror" hereafter) 20. The lamp 10 has a pair of electrodes facing each other within the light-emitting portion. The reflecting mirror 20 is placed to surround the lamp 10, and the beam axis Z of the reflecting mirror 20 matches the direction of the arc of the lamp 10, or in other words, the direction of a line connecting the tips of the electrodes.

The lamp 10 has a light-emitting portion 11 with hermetically sealed portions 12 (12a, 12b) at both ends, and one of the hermetically sealed portions 12a is installed in the neck 24 of the reflecting mirror 20. An adhesive or other means is used to fix the lamp 10 and the reflecting mirror 20, but it is acceptable to install both directly as in the figure, or to use a separate fitting (reflector base) by mounting the lamp 10 to the reflector base and then fixing the reflecting mirror 20 to the reflector base.

The reflecting mirror 20 as a whole is convex (roughly rice bowl shaped); it has a front opening M1 at the front for radiation of light, and a neck opening M2 at the rear (neck) through which the lamp 10 passes. It comprises, in order from the front opening M1, a front elliptical reflecting mirror portion 21, a middle spherical reflecting mirror portion 22, a rear elliptical reflecting mirror portion 23, and a cylindrical neck 24. The radiated light from the lamp 10 is reflected by the front elliptical reflecting mirror portion 21, the middle spherical reflecting mirror portion 22, the rear elliptical reflecting mirror portion 23 and is radiated out of the reflecting mirror through the front opening M1.

Specifically, the front elliptical reflecting mirror portion 21 comprises an ellipsoid of revolution reflecting mirror formed by the front opening M1; connected to the back of the front elliptical reflecting mirror portion 21 is the middle spherical reflecting mirror portion 22 which is a spherical mirror, and the rear elliptical reflecting mirror portion 23 which is from the ellipsoid of revolution reflection mirror 21 is connected to the back of the middle spherical reflecting mirror portion 22.

Moreover, a neck opening M2 is formed at the back edge of the rear elliptical reflecting mirror portion 23, and the neck 24 is formed in connection with the neck opening M2 as one end. The hermetically sealed portion 12a of the lamp 10 is placed so that it enters through the neck opening M2 and projects from the opening M3. The inside opening of the neck 24 is slightly larger than the outside diameter of the hermetically sealed portion 12a, and the overall shape is roughly cylindrical. Now, the neck 24 need not be cylindrical with an outer wall all around; there could be openings for cooling or adhesive insertion, and the shape is not really limited to a cylinder. Moreover, a neck 24 is not essential; if the discharge lamp 10 can be supported by an external mechanism, the neck opening M2 alone is sufficient.

Here, the position of the first focal point of the front elliptical reflecting mirror portion 21, the position of the center point of the middle spherical reflecting mirror portion 22, and the position of rear elliptical reflecting mirror portion 23 are all formed between the electrodes of the lamp 10. This position is preferably at the brightest position in the arc (the arc spot), but it is not necessarily limited to the arc spot as long is it is somewhere between the electrodes; it can be set at the center point between the electrodes for convenience, for example. That is because the inter-electrode gap is at the small level of about 2.0 mm, as described below.

Further, it is the most preferable that the position of the first focal point of the front elliptical reflecting mirror portion 21, the position of the center point of the middle spherical reflecting mirror portion 22, and the position of rear elliptical reflecting mirror portion 23 are all in complete correspondence optically, but it is acceptable if some degree of misalignment occurs within a range that has no practical effect. Because the inter-electrode gap in a lamp used as the light source for projection equipment is at a small level, not exceeding 2.0 mm, the action and effect of the invention are achieved in essence even if the position of the first focal point of the front elliptical reflecting mirror portion 21, the position of the center point of the middle spherical reflecting mirror portion 22, and the position of rear elliptical reflecting mirror portion 23 slip somewhat within that range. Therefore, if these three positions exist between the paired electrodes in the region where the arc is formed, the three positions can be said to be essentially the same as far as this invention is concerned.

Because the front elliptical reflecting mirror portion 21, the middle spherical reflecting mirror portion 22, and the rear elliptical reflecting mirror portion 23 are formed connectedly, the diameter of the opening at the back edge of the front elliptical reflecting mirror portion 21 and the diameter of the opening at the front edge of the middle spherical reflecting mirror portion 22 are the same, and the diameter of the opening at the back edge of the middle spherical reflecting mirror portion 22 and the diameter of the opening at the front edge of the rear elliptical reflecting mirror portion 23 are the same.

The front elliptical reflecting mirror portion 21, the middle spherical reflecting mirror portion 22, and the rear elliptical reflecting mirror portion 23 can constitute a whole made from the same material, physically, but it is also possible to form each reflecting mirror portion independently, or to form any one portion independently, and then combine them.

There are no particular limits on the materials used to constitute the reflecting mirror portions as long as it is possible to reflect the light radiated from the lamp. In the sense that it will be used in projection equipment, however, it is preferable that the material have excellent strength and resistance to heat. Specifically, borosilicate glass or quartz glass is used as the substrate. The reason heat resistance is needed is that when the lamp is lighted, the temperature of the reflecting mirror reaches about 400° C. The reason that strength is needed is to avoid deformation in the event that the other electronic components and optical components are densely packed within the projection equipment and to avoid breakage in the unlikely event that the lamp is broken.

The reflecting surface of each reflecting mirror portion is a reflective film applied to the substrate having excellent strength and resistance to heat in order to reflect light in the visible spectrum. The reflective film can be formed as a metallic vapor deposition film of aluminum, rhodium, and so on, or a vapor deposition multilayer film that is an appropriate accumulation of silicon oxide ($SiO_2$) and titanium oxide ($TiO_2$). Now, because the reflective film is, as a whole, a thin film with a thickness of several microns, it is not shown in the figures.

It is also possible to use a metallic material such as aluminum or copper for the reflecting mirror 20. In the case of a metallic material, there is no need for a reflective film such as a metallic vapor deposition film if the material itself can reflect visible light.

Figure 2:
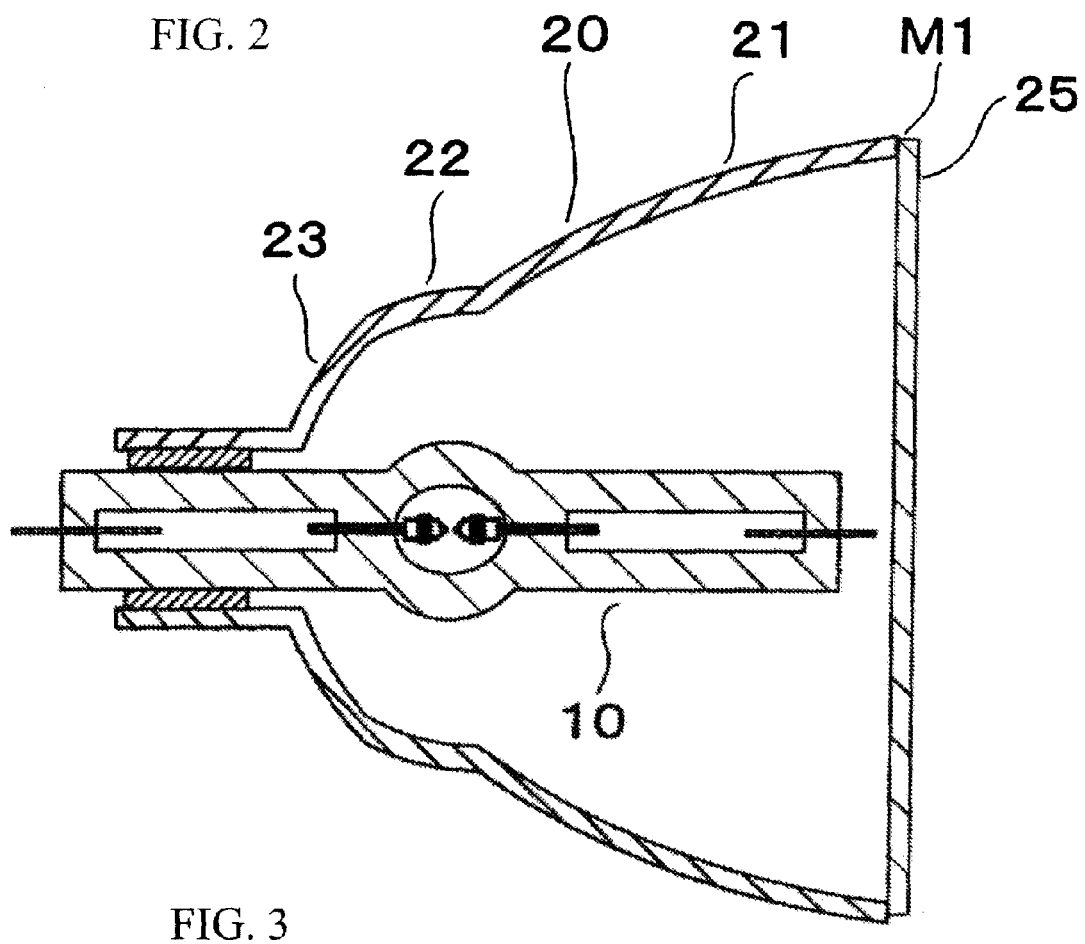
FIG. 2 shows another embodiment of the optical apparatus of this invention.

FIG. 2 is a variant of FIG. 1; it shows a constitution in which a light-transparent front glass 25 is mounted in the front opening M1 of the reflecting mirror 20. The front glass 25 is made of borosilicate glass, for example; it can be attached directly to the reflecting mirror 20 as shown in the figure, or the front glass 25 can be installed in a frame and the frame and the reflecting mirror joined together. The interior of the reflecting mirror 20 can be tightly closed by installing a front glass 25. Additionally, it is possible to install a front glass 25 without completely sealing the interior of the reflecting mirror 20 by making an opening for cooling air between the front glass 25 and the front opening M1 of the reflecting mirror 20. This opening for cooling air can be opened in the frame, or cut out of the material of the front elliptical reflecting mirror portion 21.

Further, the front glass can be external to the reflecting mirror 20 rather than being mounted directly in the front opening M1 of the reflecting mirror; if a portion of the projection equipment or other mounting parts is prepared to essentially correspond to a front glass and the reflecting mirror 20 is mounted in such projection equipment or mounting parts, the result will be that of a front glass located in the front opening M1 of the reflecting mirror.

On the other hand, the following advantages exist if there is no front glass 25, as shown in FIG. 1. That is, if most of the light reflected by the reflecting mirror 20 passes through the front glass 25 before entering the optical elements located in front of it, there will be a very small degree of re-reflection by the front glass 25; this component will illuminate the lamp 10 again. In this case, not only will be the efficiency of use of light be reduced, but this will be a factor in heating the lamp to a high temperature.

Figure 3:
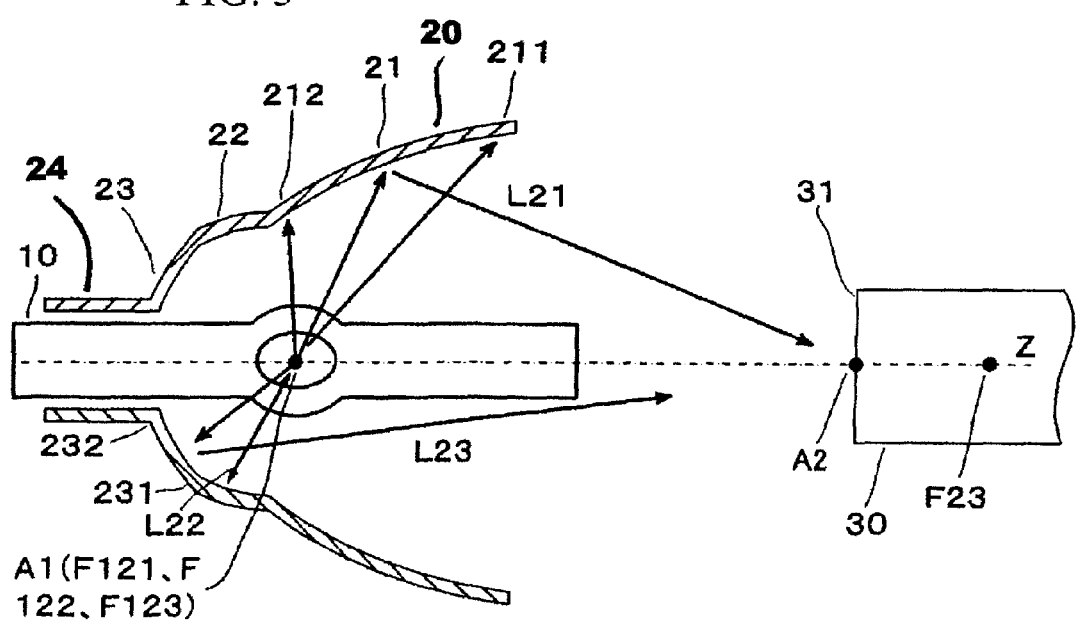
FIG. 3 shows the structure of the optical apparatus of this invention to explain the light radiation.

FIG. 3 shows the structure of the optical apparatus of this invention to explain the light radiation. For convenience of explanation, constituent elements other than the lamp and reflecting mirror have been partially deleted.

The first focal point F121 of the front elliptical reflecting mirror portion 21, the center point F122 of the middle spherical reflecting mirror portion 22, and the first focal point F123 of the rear elliptical reflecting mirror portion 23 all match the center position A1 between the electrodes of the lamp 10.

Further the second focal points of the light reflected by the front elliptical reflecting mirror portion 21 and the light reflected by the rear elliptical reflecting mirror portion 23 are positioned at the center point A2 on the plane of incidence 31 of a rod lens 30. However, in the event that the light reflected by the front elliptical reflecting mirror portion 21 and the light reflected by the rear elliptical reflecting mirror portion 23 cannot be concentrated optically at the center point A2 for a reason such as interference by the lamp itself, it is acceptable to have the second focal point of the front elliptical reflecting mirror portion 21 and the second focal point of the rear elliptical reflecting mirror portion 23 within the rod lens 30 at a position F23 on a line extended from the beam axis Z. The position of such second focal points will be determined on the basis of such things as the size of the plane of incidence 31 of the rod lens 30, the diameter of the front opening of the reflecting mirror 20, and the dimensions of the hermetically sealed portion of the lamp.

The light radiated by the lamp is reflected by the reflecting mirror 20 and is incident on the rod lens 30. Of this, light beam L21 is light reflected by the front elliptical reflecting mirror portion 21; it is concentrated toward the center point A2. Now, the reflecting mirror 20 is a body of revolution, as stated above, and so although the figure shows only beams above the beam axis Z for the sake of convenience; in reality there are light beams in all directions, centering on the beam axis Z.

Of the light radiated by the lamp, light beam L22 is light radiated toward the middle spherical reflecting mirror portion 22; after being reflected by the middle spherical reflecting mirror portion 22, it returns by the same light path to the center position A1 (F122). Then after passing through the center position A1, it is reflected by the front elliptical reflecting mirror portion and proceeds on the same route as the light beam L21. In other words, the middle spherical reflecting mirror portion 22 is a spherical surface with position A1 as its center point; it plays the role of returning all the light it reflects to the position A1. In this way, the advantage of establishing the middle spherical reflecting mirror portion 22 behind the front elliptical reflecting mirror portion 21 is the effective use of the radiated light; if the reflecting mirror were constituted of the front elliptical reflecting mirror portion 21 alone, some of the light generated at the center position A1, depending on the angle of radiation, could not be guided to the plane of incidence 31 of the rod lens 30, and if one attempted to guide all the light generated at the center position A1 to the plane of incidence 31 of the rod lens 30 using only the front elliptical reflecting mirror portion 21, such dimensional problems would arise as that the size (diameter) of the reflecting mirror 20 would have to be increased, or the diameter of the front opening of the reflecting mirror 20 would have to be increased. This point can be referred to in patent document 1 or patent document 2 mentioned above. Also, the middle spherical reflecting mirror does not necessarily have to have a spherical surface as long as the light is reflected between the paired electrodes that face within the lamp, and so any concave surface meeting that standard will do, even an elliptical surface having its first focal point and second focal point between the electrodes.

Of the light radiated from the lamp, the light beam L23 is light reflected by the rear elliptical reflecting mirror portion 23; it is concentrated toward the center point A2. Now, only the light reflected by the front elliptical reflecting mirror portion 21 is shown above the beam axis Z in the figure; the light reflected by the rear elliptical reflecting mirror portion 23 is shown below the beam axis Z. This divided description is for convenience of explanation because the tracks of the light beams would be complicated in the figure; all the reflected light has light beams in all directions, centering on the beam axis Z.

The advantage of having a rear elliptical reflecting mirror portion 23 here is in heightening the efficiency of use of light. If one considers the case in which a spherical reflecting mirror portion is formed all the way to the neck and there is no rear elliptical reflecting mirror portion 23, then of the light radiated by the arc, that part that is radiated toward the vicinity of the neck (position 232 in FIG. 3—light with a small angle from the beam axis Z), even if it is reflected by the spherical reflecting mirror portion, is diffracted by the glass tube of the lamp and then collides with and is blocked by parts such as the electrodes rather than returning to the arc. In other words, even when a spherical reflecting mirror portion is used, the light reflected in the vicinity of the neck 24 cannot return in the direction of the arc and be properly guided to the front elliptical reflecting mirror portion 21. Therefore, a rear elliptical reflecting mirror portion 23 is placed at the back of the spherical reflecting mirror portion 22, and the light incident on this rear elliptical reflecting mirror portion 23 is reflected directly toward the center point A2, not in the direction of the arc.

In the event that it is optically difficult to concentrate light from the rear elliptical reflecting mirror portion 23 on the center point A2, the light does not have to be concentrated on the center point A2; it is acceptable to form a second focal point inside the rod lens 30.

Thus, the first characteristic of the invention of this application is the point that the concave reflecting mirror is constituted with a front elliptical reflecting mirror portion, a middle spherical reflecting mirror portion, and a rear elliptical reflecting mirror portion. It is possible, by means of this constitution, to produce radiant light well without having it blocked by constituent elements or parts of the lamp, even though the concave reflecting mirror is smaller dimensionally.

Figure 4:
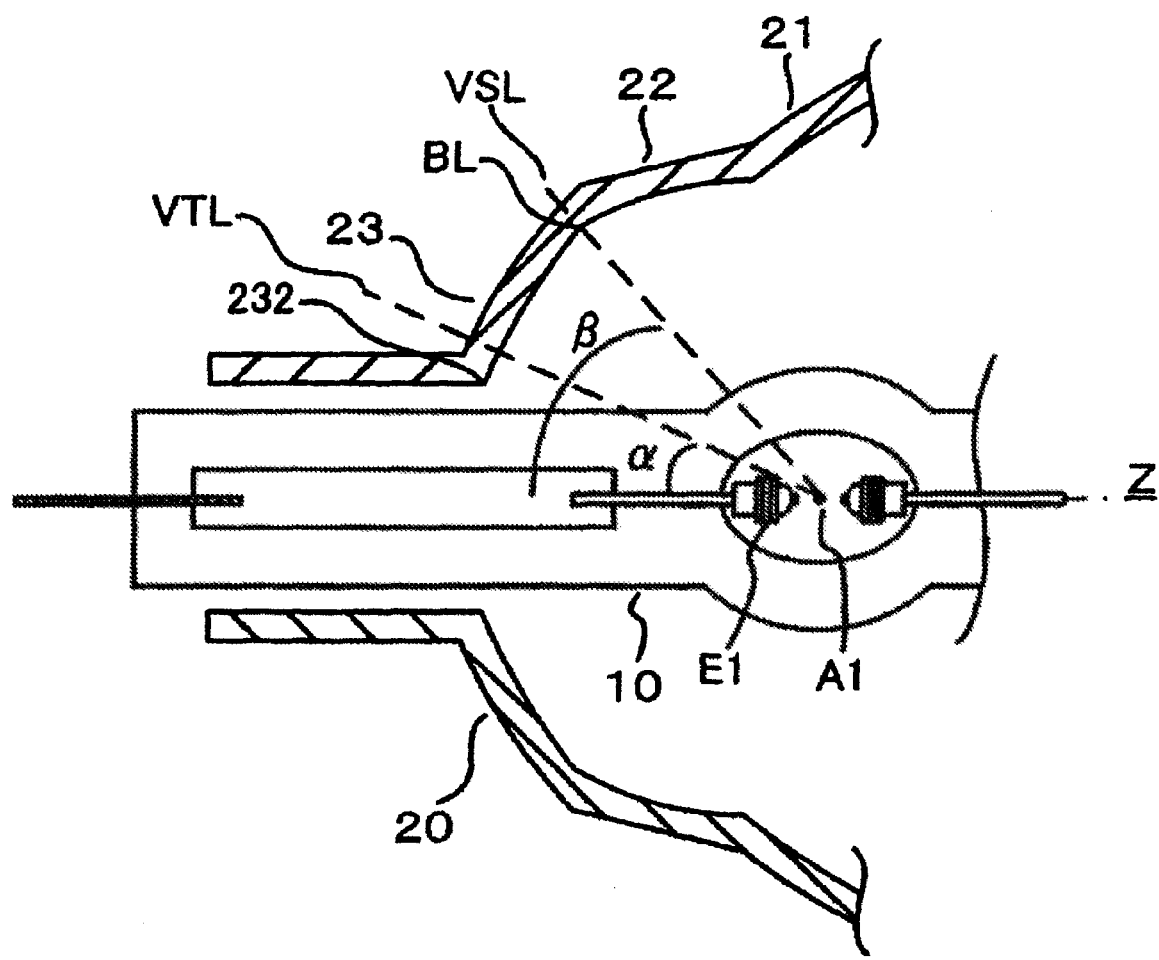
FIG. 4 shows a partial expanded view of the optical apparatus of this invention.

FIG. 4 shows a partial expanded view of the optical apparatus shown in FIG. 1.

The angle α is the angle where a virtual tangential line (VTL) that extends from the inter-electrode center position A1 in the direction of the outer surface of the electrode E1 that is positioned toward the neck of the reflecting mirror 20 meets the beam axis Z.

The angle β is the angle where a virtual straight line (VSL) that extends from the inter-electrode center position A1 in the direction of the boundary location (BL) between the middle spherical reflecting mirror portion 22 and the rear elliptical reflecting mirror portion 23 meets the beam axis Z.

The angle β here must be greater than angle α. If the angle α is greater than the angle β, then no light will be radiated directly from the arc toward the rear elliptical reflecting mirror portion 23, and it will not be possible to make use of the function of the rear elliptical reflecting mirror portion 23. Therefore, the electrode E1 must be designed so that the angle β is greater than angle α. Now, the relationship between the angle β and the angle α is preferably angle β>angle α×1.5. to make adequate use of the function of the rear elliptical reflecting mirror portion 23, it is desirable that the angle β be greater than angle α by 1.5 times or more. Further, the straight edge that connects the center position A1 to the back edge 232 of the rear elliptical reflecting mirror portion 23 forms an angle with the beam axis Z that will be the minimum value of angle α. As a numerical example, angle α could be 30° while angle β is 60°.

FIG. 5 shows variations of the electrode shape and the virtual tangential line VTL.

Figure 5A:
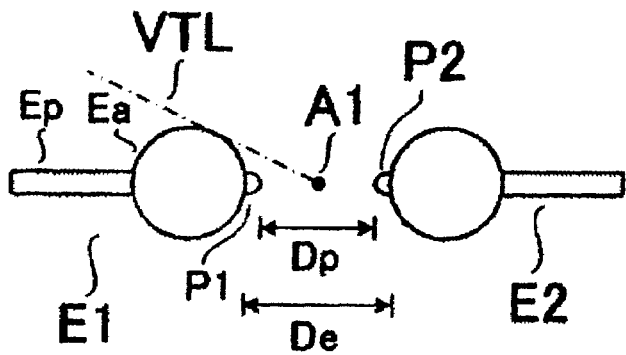
FIG. 5 shows variations of the electrode volume and the virtual tangential line in the optical apparatus of this invention.

FIG. 5(a) shows the structure with a projection formed on the tip of the electrode. The electrodes E1 and E2 each comprise a rod-shaped portion Ep and a large diameter portion Ea, and projections p1 and p2 respectively are formed on the tips of the large diameter portions Ea. In this case the center position A1 is, strictly speaking, the midpoint of the gap Dp between the tips of projections p1 and p2. For the sake of convenience, however, it can be replaced by the midpoint of the gap De between the tips of electrode E1 and electrode E2. That is because the gap is on the small level of 2.0 mm or less, and the size of the projections is on the very small level of 0.3 mm or less. Another reason is that the projections p repeatedly grow and vaporize as the lamp burns, and the length of the projections is always changing. Now, the reasons and mechanism for forming these projections are described in JP-A-2004-24792 (EP 1447836 A2, U.S. Pat. No. 7,057,346 B2) and JP-A-2001-312997 (EP 1150336 A2, U.S. Pat. No. 6,545,430 B2). Accordingly, the virtual tangential line VTL is tangential to the center position A1 and the outer surface of the large diameter portion Ea.

A structure in which the tip of the electrode E1 is a truncated cone is shown in (b). The electrode E1 comprises a rod-shaped portion Ep and a portion Eb of which the tip is a truncated cone. The virtual tangential line VTL is tangential to the center position A1 and the truncated cone portion Eb, but if the distance between the center position A1 and the truncated cone portion Eb is close, the tangential line VTL becomes a straight line that touches the edge Eb2 of the face of the tip; if the distance between the center position A1 and the truncated cone portion Eb is separated, the virtual tangential line VTL becomes a straight line that touches the edge Eb1 of the base of the truncated cone portion. In other words, the position on the electrode Eb touched by the virtual tangential line VTL will vary depending on the size of the distance between the truncated cone portion Eb and the center position A1. An electrode E1 of this sort is used primarily as the anode in a direct-current lamp.

A structure in which the electrode E1 is a bar-shaped electrode wound with a coil Ec is shown in (c). In this case, the virtual tangential line VTL describes a straight line that touches the outer periphery C1 of the coil Ec. That is because the coil Ec is the element that blocks the radiant light. Electrodes of this sort are used primarily in small discharge lamps; they are used for both electrodes in alternating-current lamps, and as the cathode in direct-current lamps. The coil Ec comprises a wire-shaped substance wrapped on the bar-shaped portion, but it can also be formed by cutting a single piece.

Incidentally, the coil Ec functions as a start point when the lamp is lighted up, and as a heat radiator during regular lighting.

The structure of the electrode E1 is what is called a fusion electrode is shown in (d). The electrode E1 comprises a rod-shaped portion Ep, a coil Ec, a large diameter portion Ed, and a projection p. This electrode is made by wrapping a wire coil on a bar and then melting the coil to form the large diameter portion Ed. In other words, the coil Ec does not melt completely; part of it remains in coil form, but the large diameter portion Ed is completely fused and does not remain in coil form. Now, the projection p can be the tip of the rod-shaped portion Ep, but it does not matter if it is not formed initially. That is because it will occur naturally. In this case, the virtual tangential line VTL is a straight line that touches the center position A1 and either the outer periphery of the large diameter portion Ed or the outer periphery of the coil Ec.

A concrete example of the electrode is shown in FIG. 5 above and explained in connection with definition of the virtual tangential line VTL and the center position A1, but the important point is that the virtual tangential line VTL is the tangential line that maximizes the region where the light radiated by the arc shines directly on the rear elliptical reflecting mirror portion 23 without being blocked by the electrode. Thus, the second point of the invention of this application is that the relationship between the angle $\alpha$ between the virtual tangential line VTL and the beam axis Z and the angle $\beta$ between the virtual straight line VSL and the beam axis Z is $\beta > \alpha$.

With regard to the discharge lamp of this invention, moreover, it is specified that the relationship between the volume V of the electrode E1 (in $mm^3$) and the wattage (P) will meet the condition, "$0.07 \times EXP(0.014 \times P) < V$." The discharge lamp of this invention reaches a very high temperature when lighted; if the volume of the electrode is smaller it will have inadequate thermal capacity and will melt. Particularly because the shape of the electrode of this invention is constrained by the requirement "angle $\beta >$ angle $\alpha$," and because the volume of the discharge space is 300 $mm^3$ or less and the maximum dimension of the discharge space (measured in the direction the electrodes extend) is about 12 mm, the electrode volume cannot be increased recklessly. The invention of this application specifies the electrode volume to meet two conditions: that the electrode not melt while the lamp is lighted, and that radiant light be able to reach the rear elliptical reflecting mirror portion. This is the third characteristic of the invention of this application.

In this invention, the relationship between the volume V of the electrode E1 (in $mm^3$) and the wattage (P) was guided by testing.

Specifically, testing was done with wattage P at one of three levels: 230 W, 250 W, and 275 W. At 230 W, five electrode volumes (in $mm^3$) were observed: 1.55, 1.60, 1.72, 1.92, and 2.02. At 250 W, four electrode volumes (in $mm^3$) were observed: 2.15, 2.27, 2.46, and 2.78. At 275 W, seven electrode volumes (in $mm^3$) were observed: 3.01, 3.08, 3.24, 3.34, 3.40, 3.68, and 3.95. Five lamps were lighted for each configuration, and so a total of 5×16 or 80 lamps were tested.

The lamps had the structure shown in FIG. 8, to be described below, with projections at the tips of the electrodes E. Accordingly, this is the electrode shown in FIG. 5(a).

The electrodes were observed after lighting for 50 cycles, each comprising 2 hours lighted followed by 15 minutes extinguished.

Following the completion of 50 cycles, the electrodes E1 were examined with an X-ray apparatus; those of which the projection had completely disappeared were evaluated as "melted," and those of which the shape of the projection was at least half that at the beginning of lighting were evaluated as "not melted." The X-ray apparatus used was the SMX-100 (made by Shimadzu Corporation).

The electrode volumes and wattages selected for the testing were all within the general range used in lamps for projection equipment. Further, the lighting conditions (50 cycles, each comprising 2 hours lighted followed by 15 minutes extinguished) were thought to represent relatively harsh use of projection equipment.

FIG. 6 shows the test results.

For 230 W and electrode volumes (in $mm^3$) of 1.55 and 1.60, the projections on all five lamps in each category disappeared completely. In the three categories with electrode volumes (in $mm^3$) of 1.72, 1.92, and 2.02, on the other hand, each of the five electrodes had its projection almost completely remaining. For 250 W and an electrode volume (in $mm^3$) of 2.15, the projections on all five lamps disappeared completely. In the three categories with electrode volumes (in $mm^3$) of 2.27, 2.46 and 2.78, on the other hand, each of the five electrodes had its projection almost completely remaining. And for 275 W and electrode volumes (in $mm^3$) of 3.01 and 3.08, the projections on all five lamps in each category disappeared completely. In the five categories with electrode volumes (in $mm^3$) of 3.24, 3.34, 3.40, 3.68, and 3.95, on the other hand, each of the five electrodes had its projection almost completely remaining.

Figure 7:
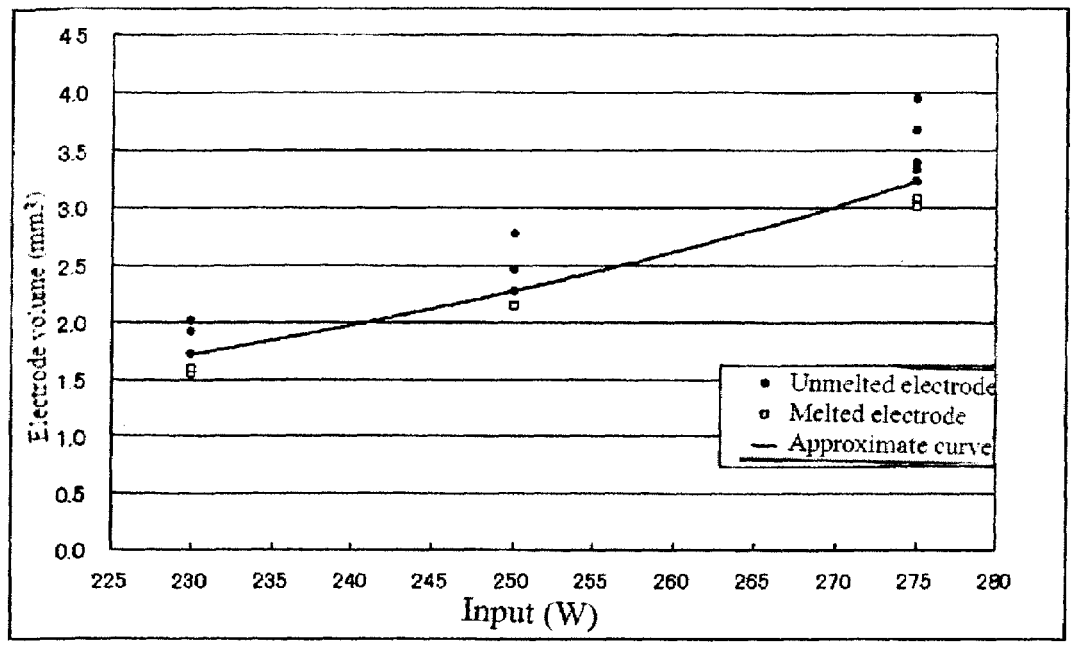
FIG. 7 shows testing results of the optical apparatus of this invention.

The test results described above are graphed in FIG. 7. The vertical axis represents the electrode volume ($mm^3$) and the horizontal axis represents the rated power P (wattage).

An approximate curve was drawn through the points representing the smallest volume of the unmelted electrodes of each wattage P. The approximate curve was described by the formula, "$V = 0.0675 e^{0.0141P}$" (e to the 0.0141P power). Considering possible errors, this led to "$0.07 \times EXP(0.014 \times P) < V$" as the formula for the relationship between the electrode volume (in $mm^3$) and the rated wattage P.

Thus the invention of this application specifies the relationship between the electrode volume (in $mm^3$) and the wattage P as "$0.07 \times EXP(0.014 \times P) < V$" so that the electrode will not melt while the lamp is lighted, even given the constraints on electrode shape such that light radiated by the arc can reach to the rear elliptical reflecting mirror portion of the concave reflecting mirror.

Figure 5B:
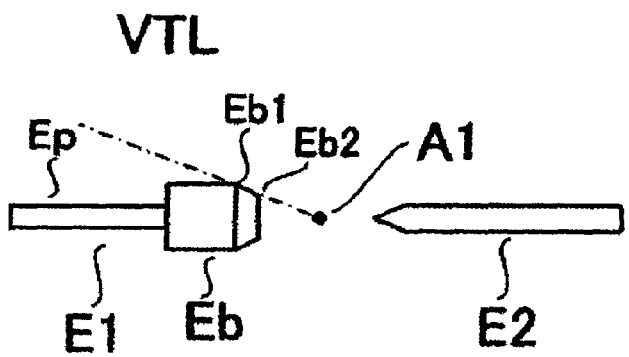
Figure 5C:
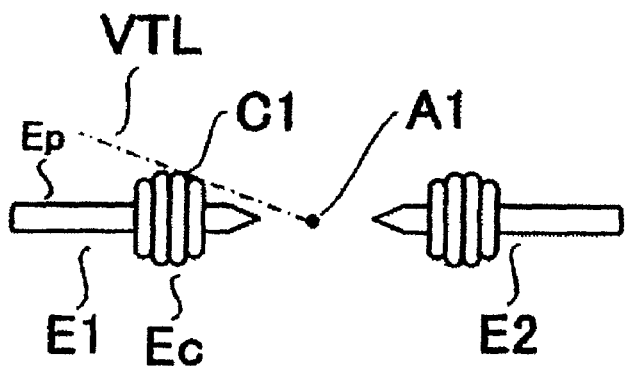
Figure 5D:
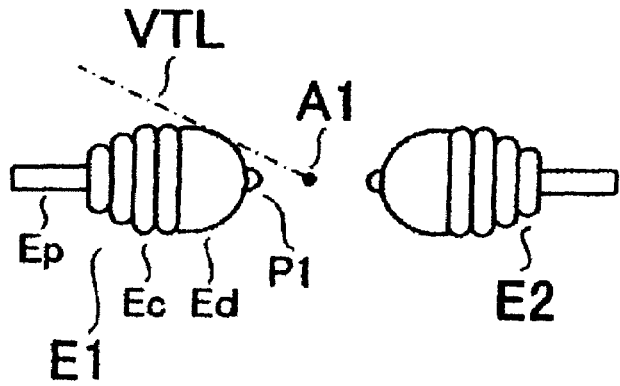

The "electrode volume" in this invention refers to the large diameter portion at the tip of the rod-shaped portion, and does not include the rod-shaped portion itself. This is the volume of the large diameter portion Ea in FIG. 5(a). Now, strictly speaking this should be interpreted to include the volume of the projection p, but the volume of the projection p is small relative to the volume of the large diameter portion Ea and its volume changes over the course of time while the lamp is lighted, and so in practical terms the volume of the large diameter portion Ea alone can be used. In FIG. 5(b), the volume of the truncated cone portion Eb is meant. In this case, as in (a), the volume of the rod-shaped portion Ep is not included. In FIG. 5(c), the interpretation includes the volume of both the coil Ec and the rod-shaped portion Ep that projects forward of the coil Ec. The rod-shaped portion Ep behind the coil Ec is not included. In FIG. 5(d), the total volume of the coil Ec and the large diameter portion Ed is meant.

Further, "wattage" is the wattage marked on the lamp or discharge vessel, and is the power consumed by the lamp not including ballast losses.

Examples of numerical values of the optical apparatus shown in FIG. 1 are given here.

Overall length of the reflecting mirror (on beam axis) is 34.2 mm;
length of front elliptical reflecting mirror portion 21 (on beam axis) is 26.0 mm;
length of middle spherical reflecting mirror portion 22 (on beam axis) is 6.4 mm;
length of rear elliptical reflecting mirror portion 23 (on beam axis) is 2.0 mm;
diameter of front opening of front elliptical reflecting mirror portion 21 is 39.3 mm;
diameter of front opening of middle spherical reflecting mirror portion 22 is 22.0 mm;
diameter of front opening of rear elliptical reflecting mirror portion 23 is 18.0 mm;
diameter of rear opening of rear elliptical reflecting mirror portion 23 is $\phi$10.0 mm;
first focal length of front elliptical reflecting mirror portion 21 is 6.0 mm;
second focal length of front elliptical reflecting mirror portion 21 is 65.0 mm;
inter-electrode gap of lamp is 1.0 mm;
separation of front opening of reflecting mirror from plane of incidence of optical element is 33.0 mm;
area of plane of incidence of optical element is 28.27 mm$^2$ (($\phi$6);
angle $\alpha$ is 30°;
angle $\beta$ is 60°.

Figure 8:
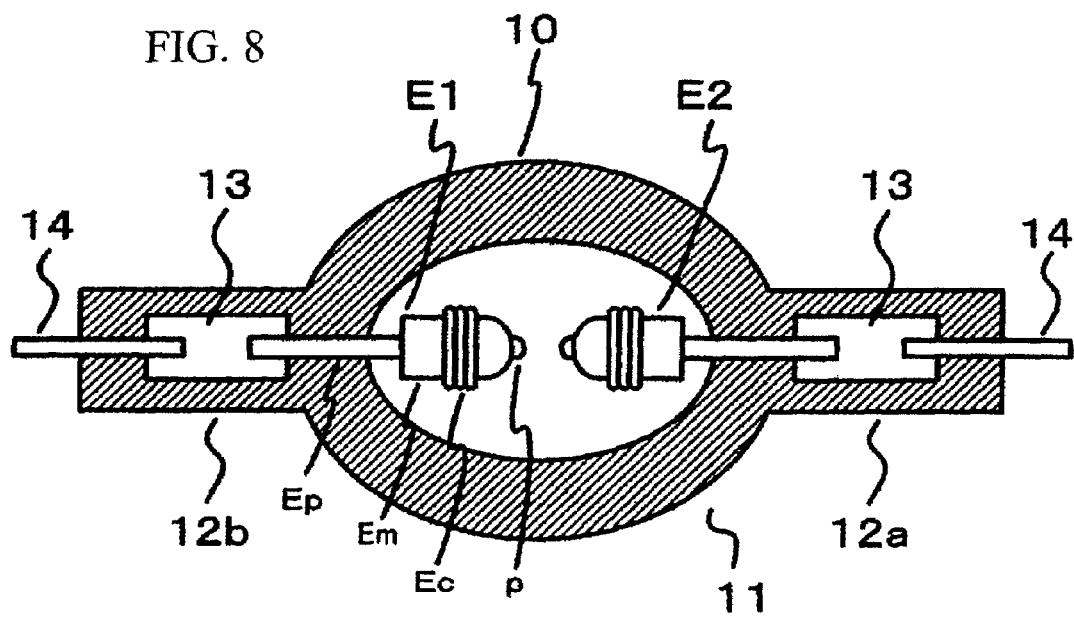
FIG. 8 shows the discharge lamp of the optical apparatus of this invention.

FIG. 8 shows the high-pressure discharge lamp that is the object of this invention.

The discharge lamp 10 has a roughly spherical light-emitting portion 11 formed by a discharge vessel made of quartz glass. Within the light-emitting portion 11, paired electrodes E (E1, E2) with massive tips face each other across a gap not exceeding 2 mm. Hermetically sealed portions 12 are formed at both ends of the light-emitting portion 11. A conductive metal foil 13 made of molybdenum is hermetically sealed into the hermetically sealed portion, preferably by means of shrink sealing. One end of the metal foil 13 is connected to the axial portion of the electrode E, and the other end of the metal foil 13 is connected to an external lead 14 that is fed power by an external power supply.

The electrode E (E1) has a large diameter portion Em formed on a rod-shaped portion Ep; a coil Em is fitted around the large diameter portion Em. A projection p is formed on the tip of the large diameter portion Em. The rod-shaped portion Ep, large diameter portion Em, coil Ec and projection c are made by cutting down a single tungsten rod. For this reason, it can be made with the overall shape of the electrode according to the design better and the angle $\alpha$ more accurate than what is called a fusion electrode (an electrode of which the large diameter portion is formed by wrapping a tungsten rod with a wire coil and fusing the coil). Now the projection p is formed as a pre-seed, but its length grows and vaporizes repeatedly as the lamp burns, and so the size of the projection p changes. Now, it is possible to manufacture the electrode E without a projection p. In this case, the projection will form automatically as the lamp burns.

Mercury, rare gas, and halogen gas are sealed into the light-emitting portion. The mercury is used to obtain radiant light of the required visible wavelength, 360 to 780 nm for example, and so at least 0.2 mg/mm$^3$ is sealed in. The amount included will vary with temperature conditions, but there will be a very high vapor pressure of 200 atmospheres or more when lighted. It is possible to produce a very high mercury vapor pressure discharge lamp with a mercury vapor pressure of 250 atmospheres, 300 atmospheres, or more by including more mercury; the higher the mercury vapor pressure is, the better it is suited as a light source for projection equipment.

As for the rare gas, about 13 kPa of argon gas, for example, is sealed in. Its function is to improve start-up characteristics. The halogen is one like iodine, bromine, or chlorine included in the form of a compound of mercury or another metal. The amount of halogen included can be selected within the range from 10$^{-6}$ µmol/mm$^3$ to 10$^{-2}$ µmol/mm$^3$. The function of the halogen is to prolong service life by means of what is called the halogen cycle; in a very small lamp with very high vapor pressure while lighted, as in the case of the discharge lamp of this invention, it also acts to prevent devitrification of the discharge vessel.

The numerical example of the discharge lamp is, for example, an alternating-current lamp with a light-emitting portion 11 having a maximum outside diameter of 11.5 mm, an inter-electrode gap of 1.0 mm, a capacity of 75 mm$^3$ in the light-emitting tube, a rated voltage of 75 V, and a rated wattage of 200 W.

Further, discharge lamps of this type are mounted in compact projection equipment, and so they are expected to have high luminous energy as well as very small overall dimensions. Thermal effects within the light-emitting portion are, therefore, very severe. The tube wall load of the lamp is from 0.8 to 2.0 W/mm$^2$, specifically 1.5 W/mm$^2$.

When mounted in projection equipment or overhead projectors, these high mercury vapor pressure and tube wall load value values provide light with good color rendering.

Now, the discharge lamps are not limited to alternating current lighting; direct current lighting is also acceptable.

Figure 9:
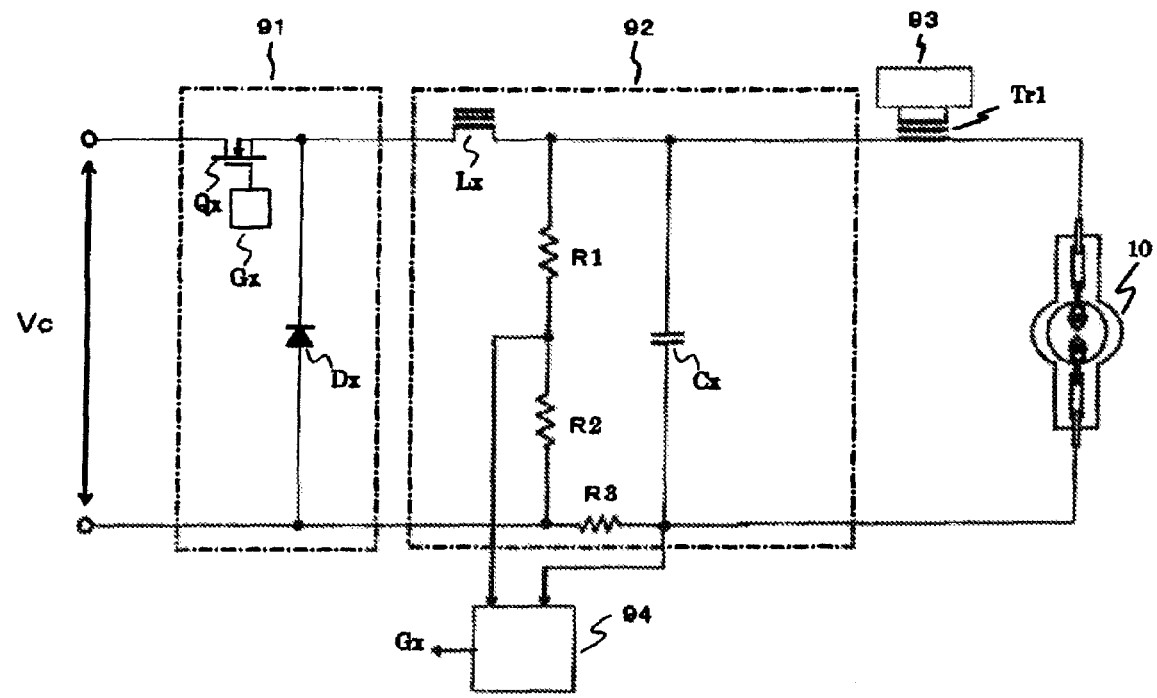
FIG. 9 shows the power supply of the optical apparatus of this invention.

FIG. 9 shows the power supply for lighting the discharge lamp of this invention.

The power supply comprises a chopper circuit 91 that includes a switching element Qx, a smoothing circuit 92 that includes a coil Lx and a capacitor Cx, a starter circuit 93 for starting up, and a control circuit 94 that drives the switching element Qx.

In the control circuit 94, the lighting voltage and current of the discharge lamp 10 are detected by the resistors R1, R2, and R3, the lighting wattage is calculated and compared with the standard power value, and feedback control of the switching element Qx is done.

The current controlled in the chopper circuit 91 becomes direct current output in the smoothing circuit 92 and is provided to the discharge lamp 10.

In the lighting operation, first high voltage pulses are generated by the starter circuit 93, and then dielectric breakdown occurs between the electrodes of the discharge lamp 10 and a glow discharge occurs. The glow discharge eventually becomes an arc discharge and the discharge lamp stabilizes.

As explained above, in the optical apparatus of the invention of this application the concave reflecting mirror comprises a front elliptical reflecting mirror portion, a middle spherical reflecting mirror portion, and a rear elliptical reflecting mirror portion, and so the light reflected by the rear elliptical reflecting mirror portion does not return to the discharge arc but is reflected toward the front opening.

Further, the relationship between the angle $\alpha$ formed by a virtual tangential line VTL, which runs from the center position A1 between the electrodes to the outer surface of the electrode positioned towards the neck of the concave reflecting mirror, and the direction in which the electrode of the discharge lamp extends and the angle $\beta$ formed by a virtual straight line VSL, which runs from the center position CP to the boundary position between the middle spherical reflecting mirror portion and the rear elliptical reflecting mirror portion, and the direction in which the electrode of the discharge lamp extends is $\beta>\alpha$, and so the shape of the electrode positioned toward the neck is stipulated in such a way that the light to be reflected by the rear elliptical reflecting mirror portion will be adequate.

Moreover, because the relationship between the volume V (in mm$^3$) of the one of the pair of discharge lamp electrodes that is positioned opposite the direction of light radiation of the concave reflecting mirror and the wattage (P) during steady lighting meets the condition, $0.07\times EXP(0.014\times P)<V$, the function of withstanding heat capacity can be preserved while meeting the stipulation of the size and shape of the electrode positioned toward the neck.

What is claimed is:

1. An optical apparatus that comprises a short-arc type discharge lamp with a pair of electrodes that face each other within a discharge vessel and a concave reflecting mirror placed to surround the discharge lamp with its beam axis matching the arc direction of the discharge lamp, in which the concave reflecting mirror comprises a front elliptical reflecting mirror portion, a middle spherical reflecting mirror portion, and a rear elliptical reflecting mirror portion;

the front elliptical reflecting mirror portion and the rear elliptical reflecting mirror portion have at least their first focal points collocated between the electrodes, are positioned front and back in relation to the direction of light radiation of the concave reflecting mirror, the middle spherical reflecting mirror portion being located between the front elliptical reflecting mirror portion and the rear elliptical reflecting mirror portion with the first focal points mentioned above as the center position CP;

the relationship between an angle $\alpha$ formed by a virtual tangential line VTL, which runs from the center position CP to the outer surface of the electrode positioned towards the neck of the concave reflecting mirror, and the direction in which the electrode of the discharge lamp extends and an angle $\beta$ formed by a virtual straight line VSL, which runs from the center position CP to the boundary position between the middle spherical reflecting mirror portion and the rear elliptical reflecting mirror portion, and the direction in which the electrode of the discharge lamp extends is $\beta>\alpha$; and the relationship between the volume V (in mm$^3$) of the one of the pair of electrodes that is positioned opposite the direction of light radiation of the concave reflecting mirror and the wattage (P) during steady lighting meets the condition, $0.07\times EXP(0.014\times P)<V$.

* * * * *